US005588320A

United States Patent [19]

Lallier

[11] Patent Number: 5,588,320

[45] Date of Patent: Dec. 31, 1996

[54] CORNERBEAD CRIMPING TOOL

[76] Inventor: Guy Lallier, 3837 Coco Plum, Circle, Karanda Village 3, Pompano Beach, Fla. 33063

[21] Appl. No.: 811,782

[22] Filed: Dec. 20, 1991

Related U.S. Application Data

[63] Continuation-in-part of Ser. No. 513,987, Apr. 24, 1990, Pat. No. 5,209,097, which is a continuation-in-part of Ser. No. 448,737, Dec. 11, 1989, abandoned.

[51] Int. Cl.[6] .................................................. B23P 11/00

[52] U.S. Cl. ........................ 72/325; 72/453.16; 29/243.5

[58] Field of Search ................................ 72/325, 453.16, 72/453.15, 453.01, 407; 29/21.1, 432.2, 243.5, 243.58, 243.57

[56] References Cited

U.S. PATENT DOCUMENTS

| | | | |
|---|---|---|---|
| 1,743,209 | 1/1930 | Groehn | 72/451 |
| 2,800,960 | 7/1957 | Cutler | 29/21.1 |
| 2,859,445 | 11/1958 | Larrabee | 72/325 |
| 2,944,262 | 7/1960 | Richman . | |
| 3,023,417 | 3/1962 | Michel . | |
| 3,160,890 | 12/1964 | Lefebvre . | |
| 3,170,162 | 2/1965 | Balinski | 72/325 |
| 3,255,525 | 6/1966 | Frenzel . | |
| 3,372,479 | 3/1968 | Fischer . | |
| 3,526,944 | 9/1970 | Cherup . | |
| 3,706,245 | 12/1972 | Van Schaik | 81/301 |
| 3,821,890 | 7/1974 | Dewey . | |
| 3,892,029 | 7/1975 | Militello | 30/366 |
| 4,288,016 | 9/1981 | Failla | 227/30 |
| 4,571,975 | 2/1986 | Pawloski | 72/325 |
| 4,589,272 | 5/1986 | Hutson | 72/453.16 |
| 4,593,443 | 6/1986 | Wolford | 29/243.5 |
| 4,893,493 | 1/1990 | Jacques | 72/325 |
| 4,989,438 | 2/1991 | Simon | 72/325 |
| 5,040,400 | 8/1991 | Natasi | 72/453.16 |

FOREIGN PATENT DOCUMENTS

| | | | |
|---|---|---|---|
| 994441 | 11/1951 | France | 72/325 |
| 2423226 | 11/1975 | Germany . | |
| 335826 | 10/1930 | United Kingdom | 29/21.1 |
| 747766 | 4/1956 | United Kingdom | 81/301 |

*Primary Examiner*—Daniel C. Crane
*Attorney, Agent, or Firm*—Fishman, Dionne & Cantor

[57] ABSTRACT

A cornerbead crimping tool for crimping cornerbead to wallboard is presented which comprises in a first embodiment a handle portion, an intermediate air cylinder portion and a crimping head portion which together form the crimping tool. In accordance with a second and preferred embodiment of the present invention, the crimper tool of the present invention is a user configurable system comprising a housing module, a plurality of interchangeable crimper modules and a plurality of interchangeable power modules (e.g., pneumatic operation and manual operation). The resultant system provides the cornerbead applicator with the ability to quickly and easily crimp cornerbead of any known size or shape using either a manual (e.g., hammer) operation or pneumatic operation. All of the system parts are made from molded reinforced plastic and due to the modular, interchangeable construction lead to ease of manufacture as well as low cost assembly.

19 Claims, 14 Drawing Sheets

CORNERBEAD CRIMPING TOOL

CROSS-REFERENCE TO RELATED APPLICATION

This is a continuation-in-part of U.S. application Ser. No. 513,987 filed Apr. 24, 1990 now U.S. Pat. No. 5,209,097, which is a continuation-in-part of U.S. application Ser. No. 448,737 filed Dec. 11, 1989, now abandoned.

BACKGROUND OF THE INVENTION

This invention relates generally to a device for installing metal corner strip used in conjunction with a wallboard assembly. More particularly, this invention relates to a device for installing metal cornerstrip or cornerbead on wallboard wherein the installation device is fluid activated, preferably by air.

Wallboard or sheetrock is well known and is used to provide smooth wall surfaces to the interiors of buildings. As is also well known, the corner or edge where two wallboards form a 90° angle require a metal cornerstrip to protect the wallboard corners from breakage. This metal cornerstrip comprises a flat metal sheet which is bent at an angle along the longitudinal center thereof. Typically, the flat metal sheet has spaced openings therethrough for receiving fasteners or the like. Metal cornerstrip of this type is well known by the term "cornerbead" and shall be referred to by that term hereinafter.

As mentioned, cornerbead is typically attached to the corner of a pair of wallboard sections using threaded fasteners or the like. It will be appreciated that the use of threaded fasteners to attach the cornerbead can be time consuming and therefore undesirable. Attempts to mechanically attach cornerbead by fastener means are known. For example, hammer actuated cornerbead crimping or clincher devices are known wherein a hammer actuates a cornerbead crimping device which then drives the cornerbead into the wallboard through a crimping action. Typically, these devices comprise a pair of articulated arms pivotably attached to a support which is received in a housing. The arms terminate at a pair of pointed teeth. When the housing is placed flush up against a cornerbead, a blow of the hammer against the support will drive the articulated arms against the cornerbead and pivot the teeth into the cornerbead thereby providing the required crimping action.

While suited for its intended purposes, the hammer actuated cornerbead crimper requires the installer to use both hands, one for holding the crimper and the other for driving the hammer. This process is both difficult and cumbersome and therefore a power actuated crimper is desired. Known manual operated crimpers are described in U.S. Pat. Nos. 2,859,445, 2,944,262 and 3,170,162. Known power actuated crimpers are disclosed in U.S. Pat. Nos. 4,893,493, 4,989,438 and 5,040,400. However, there are no crimping devices presently known which allow both manual or powered operation. This leads to several disadvantages and perceived deficiencies.

SUMMARY OF THE INVENTION

The above discussed and other deficiencies and drawbacks of the prior art are overcome or alleviated by the cornerbead crimping tool of the present invention. In accordance with a first embodiment of the present invention, the cornerbead crimping tool comprises a handle portion, an intermediate air cylinder portion and a crimping head portion which together form the crimping tool. The handle portion includes a trigger which, when actuated, delivers high pressure fluid (typically air) through a valve to a cylinder which includes a spring actuated piston therein. The piston is actuated by the high pressure air from the handle so that the piston rod is driven forward to an opening in the cylinder and into the crimping head portion. The crimping head includes a rigid housing having a V-shaped end for engagement to the cornerbead. A drive shaft is mounted in an opening within the housing and it is engaged by the piston rod. The drive shaft is pivotably attached to articulated arms which terminate at crimping teeth. Thus, when the cylinder rod is forced outwardly of the cylinder, the drive shaft is actuated outwardly forcing the articulated arms inwardly wherein the crimping teeth crimp the cornerbead and secure the cornerbead onto a wallboard corner. The handle includes a flow opening so that subsequent to a driving stroke, the spring actuated piston can return to its normal position and the air present in the cylinder may exit through the flow opening in the handle.

Preferably, the V-shaped end of the crimping head also includes a semi-cylindrical cut-out portion for mating with rounded cornerbead. Such a head configuration would have the advantage of crimping cornerbeads having both 90 degree corners or rounded corners.

The cornerbead clincher in accordance with the present invention provides many features and advantages relative to either the hammer actuated cornerbead crimpers of the prior art or the electrical solenoid actuated cornerbead crimpers. These features and advantages include economy of manufacture in the small number of parts needed to make the power actuated cornerbead crimper. In addition, the high power achievable using high pressure fluid provides improved crimping characteristics relative to the hand actuated or electrical actuated prior art cornerbead crimpers.

In accordance with a second and preferred embodiment of the present invention, the crimper tool of the present invention is a user configurable system comprising a housing module, a plurality of interchangeable crimper modules and a plurality of interchangeable power modules (e.g., pneumatic operation and manual operation). The resultant system provides the cornerbead applicator with the ability to quickly and easily crimp cornerbead of any known size or shape using either a manual (e.g., hammer) operation or pneumatic operation. All of the system parts are made from molded reinforced plastic and due to the modular, interchangeable construction lead to ease of manufacture as well as low cost assembly.

The above discussed and other features and advantages of the present invention will be appreciated and understood by those of ordinary skill in the art from the following detailed description and drawings.

BRIEF DESCRIPTION OF THE DRAWINGS

Referring now to the drawings, wherein like elements are numbered alike in the several FIGURES.

Figure 1:
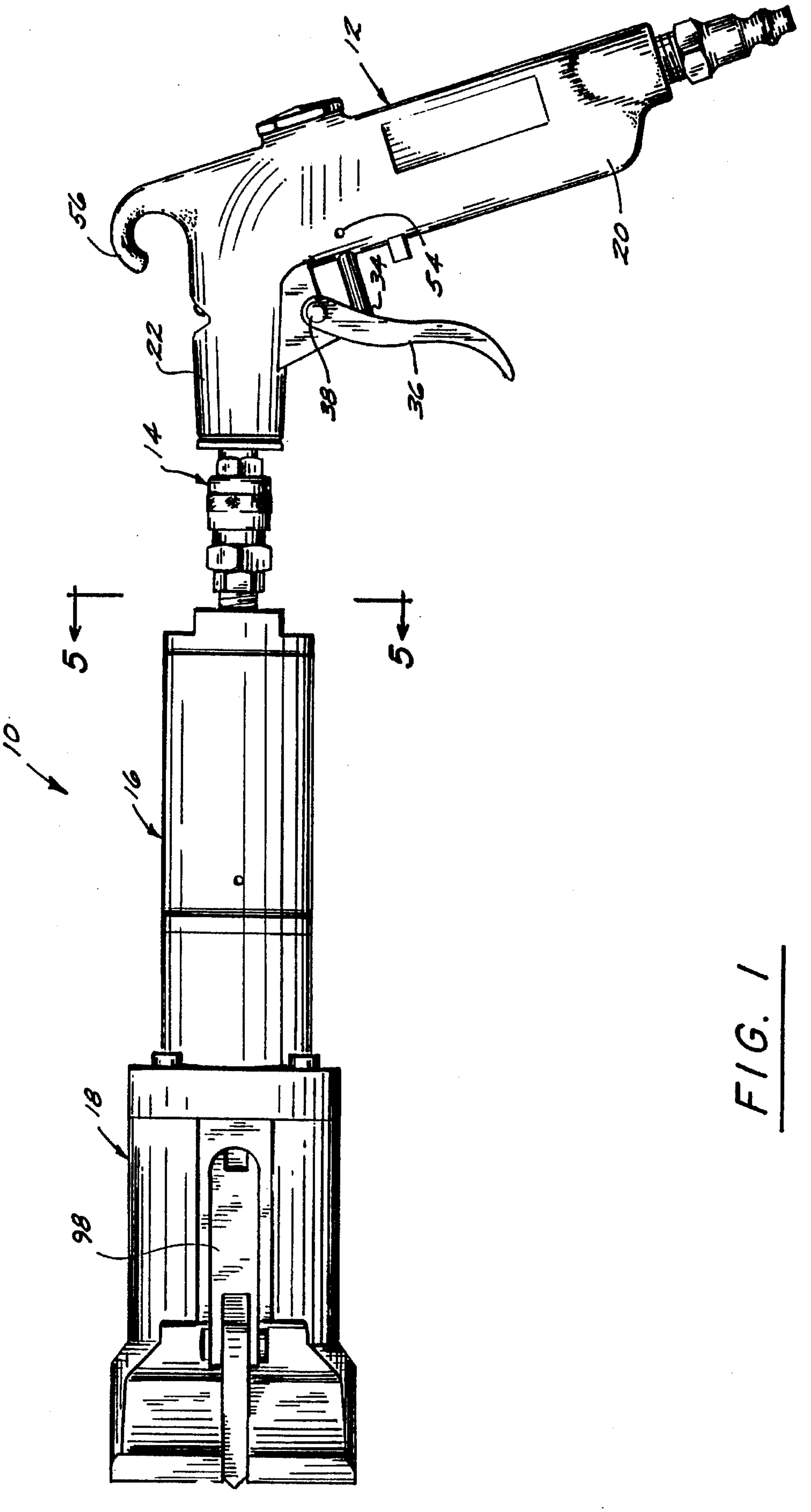
FIG. 1 is a side elevation view of the pneumatic crimping device in accordance with the present invention.
Figure 2:
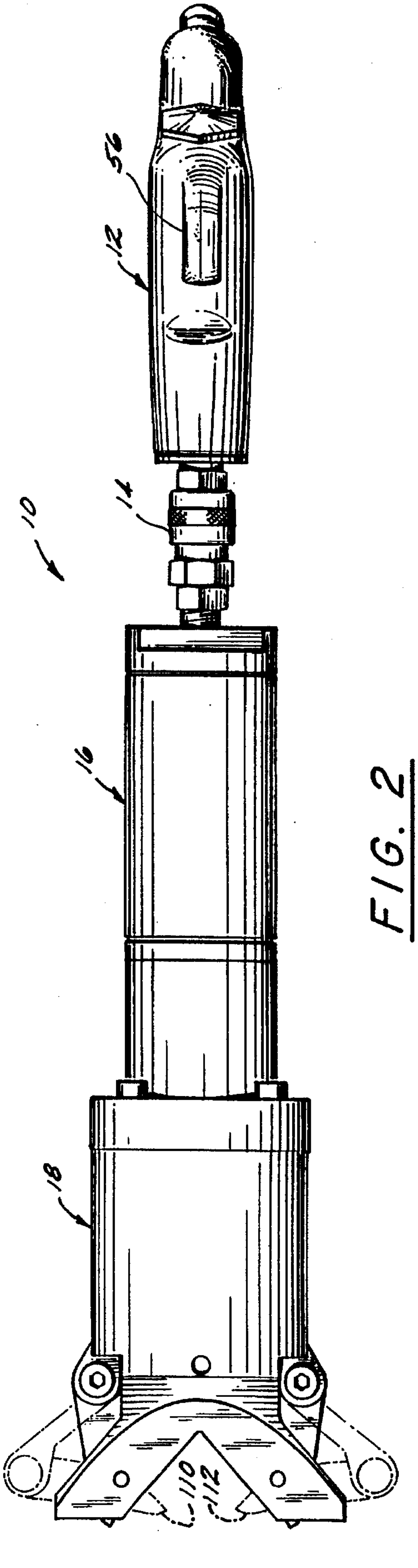
FIG. 2 is a top plan view of the device of FIG. 1.
Figure 3:
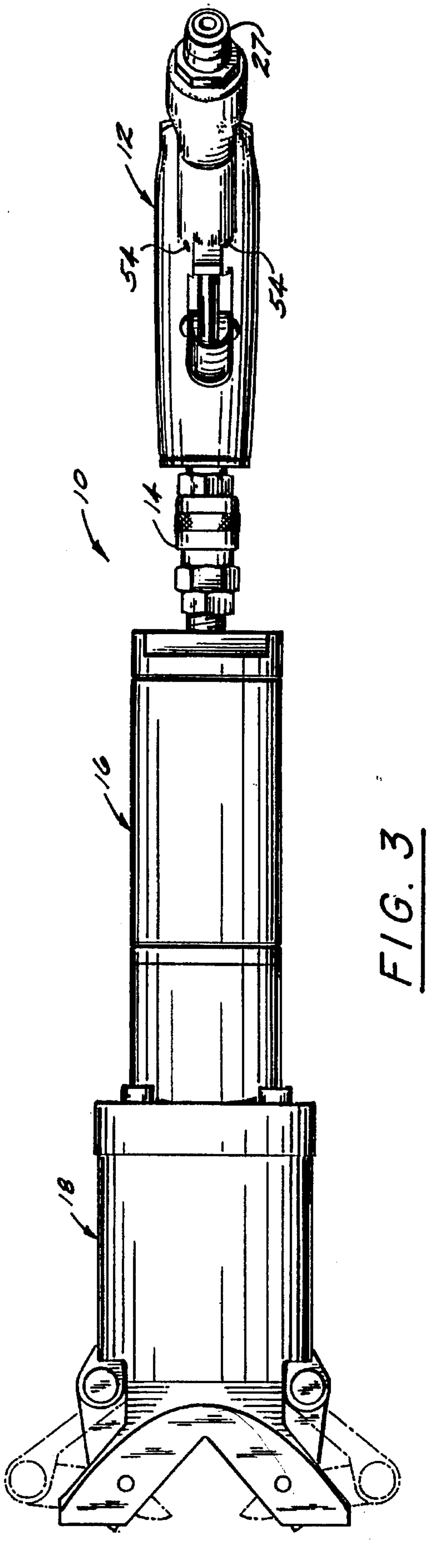
FIG. 3 is a bottom view of the device of FIG. 1.
Figure 6:
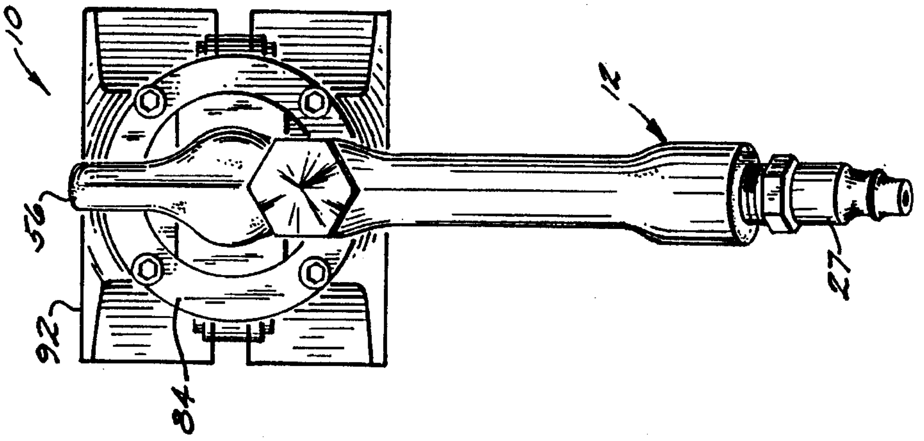
FIG. 6 is a rear elevation view of the device of FIG. 1.
Figure 5:
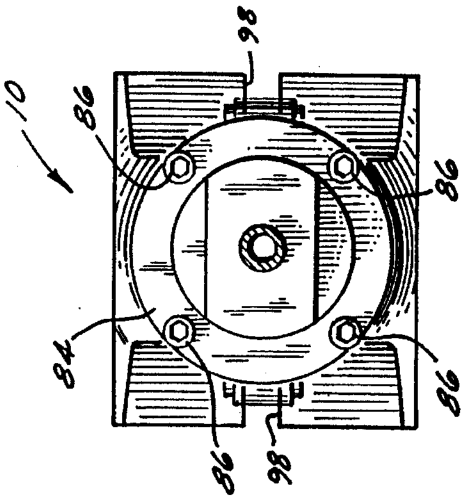
FIG. 5 is a cross sectional elevation view along the line 5—5 of FIG. 1.

DESCRIPTION OF THE PREFERRED EMBODIMENT:

Referring jointly to FIGS. 1–7, a first embodiment of a fluid driven cornerbead crimping tool in accordance with the present invention is shown generally at 10. Crimping device 10 includes a handle portion 12 which is connected by a known pneumatic connector 14 to an air cylinder 16. In turn, cylinder 16 is threadably connected to a crimping head 18.

Figure 7:
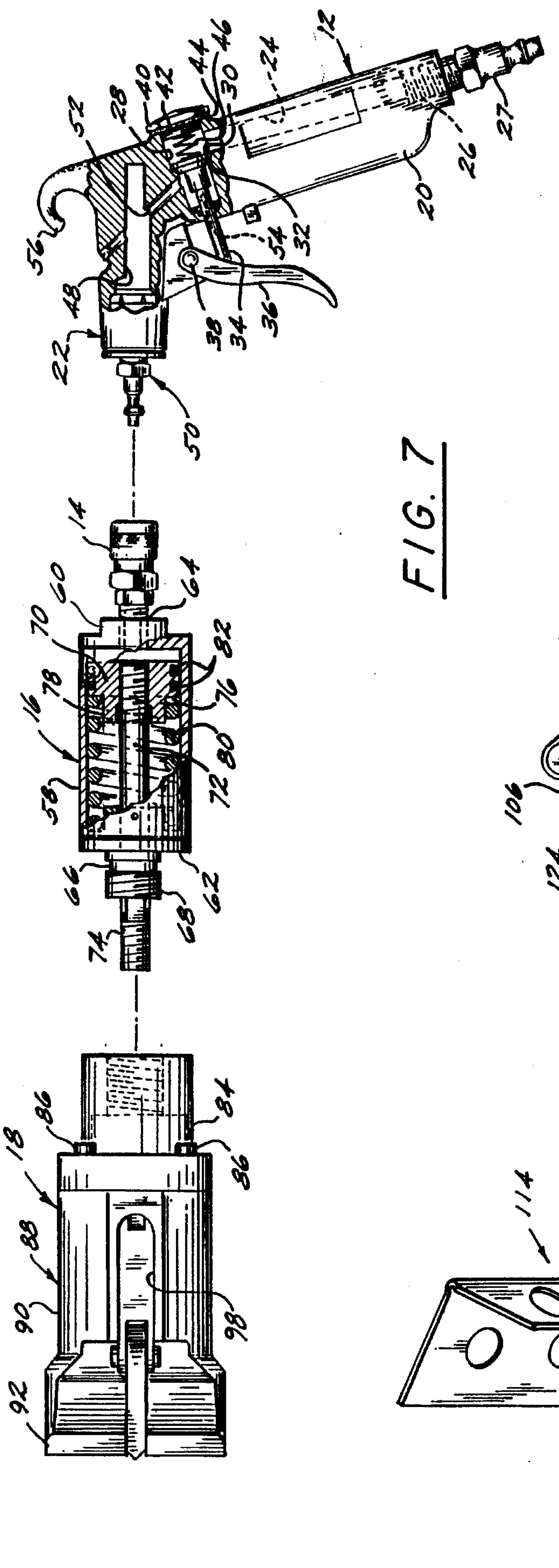
FIG. 7 is an exploded side elevation view of the device of FIG. 1.

Referring to FIG. 7, handle 12 has a grip or inlet end 20 and a nozzle or outlet end 22 angularly extending therefrom. Grip end 20 is formed with a passage 24 leading therein to from a threaded inlet 26 having a fitting 27 threaded therein, allowing connection with the flexible hose of a conventional compressed air line (not shown). Passage 24 communicates at its inboard terminal with a circular valve well or cavity 28 in the handle, which well 28 is formed with an intermediate annular shoulder serving as a valve seat for a valve 30 having a resilient seat 32 and a valve stem 34 depending therefrom. Valve 30 is reciprocable relative to the handle body so that, in a closed position, as shown, the valve 30 rests on the valve seat 32 of the valve well 28 to close off communication between the upper and lower regions of the valve well and in an opened position, the valve is upwardly of the valve seat to allow communication between the upper and lower regions of the valve well.

A trigger 36 of conventional configuration is pivotably mounted on the body 12 by means of a trigger pin 38 and the lower extremity of valve stem 34 extendable through a suitable opening in the handle body. As trigger 36 is operated inwardly, valve 30 is elevated upwardly of its seat to an "open" position thereabove.

The upper wall of valve well 20 is threaded and a hex nut 40 having a depending threaded portion 42 is threadably engaged therewith in the valve well closing function. A gasket 44 circumscribes threaded portion 42 to ensure a tight closure. A valve spring 46 nestably seats in opposed spring seats in threaded portion 42 and valve 30 and urges the valve returnably onto its seat when the raised trigger is manually released. Nozzle end 22 has a passage 48 leading therein from an outlet 52. A nozzle, generally indicated by 50, is threadably received into passage 48.

An internal channel 52 extends between passage 48 and the lower portion of cavity 28. As best seen in FIG. 1, a pair of openings 54 extend between the lower portion of cavity 28 and the outside of handle 12. As a result, when valve 32 is in the closed position as shown in FIG. 7, any pressurized air within passage 48 will flow through channel 52 and out of handle 12 through flow openings 54.

Handle 12 also includes a hook 56 which may be used during storage. It will be appreciated that aside from the important flow openings 54, the remainder of handle 12 is known and commercially available. Handles of this general type are disclosed in U.S. Pat. Nos. 2,783,092 and 3,780, 949.

Still referring to FIG. 7, a description will now be made of air cylinder 16. Cylinder 16 is a known device which is also commercially available. Cylinder 16 includes a cylindrical tube 58 and a pair of opposed flanged caps 60 and 62 on opposite ends of tube 58. Flange 60 includes a threaded opening 64 which threadably receives a known pneumatic fitting 14 therein. Flange 62 has an extended hub 66 which has both external threading identified at 68.

The interior of air cylinder 16 includes a piston comprising a piston head 70 threaded to a piston rod 72. Piston rod 72 extends through hub 66 outwardly of air cylinder 16 and includes threading 74 at the terminal end thereof. Piston head 70 includes a shoulder 76 and a section of lesser diameter 78 which receives a spring 80. Spring 80 is biased between piston head 70 and the interior surface of flange 62 so that piston head 70 is normally urged towards the right in FIG. 7 against flange 60. It will be appreciated that when pressurized fluid (air) is delivered through opening 64 of flange 60, piston head 76 is urged towards the left in FIG. 7 so that spring 80 is biased and piston rod 72 is urged outwardly of cylinder 58 towards the left in FIG. 7. A pair of seals 82 are positioned about the circumference of piston head 70 to prevent leakage of fluid around the piston head.

Figure 4:
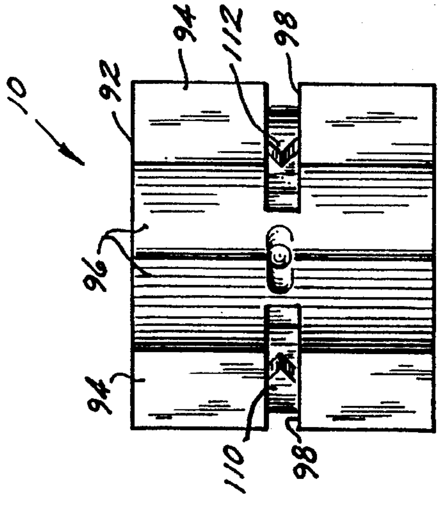
FIG. 4 is a front elevation view of the device of FIG. 1.

Still referring to FIGS. 1–7, cylinder head 18 includes a two piece body comprised of a flange 84 which is threaded (via four equally spaced screws 86) to a main body portion 88. Main body portion 88 has a cylindrical section 90 which terminates at a V-shaped head 92. Preferably, both portions 90 and 92 are machined or cast as one-piece. As best seen in FIG. 4, body portion 92 has a pair of outer flats 94 connected by a V 96. A pair of opposed grooves 98 extend towards each other from flats 94 inwardly towards V-section 96.

Figure 9:
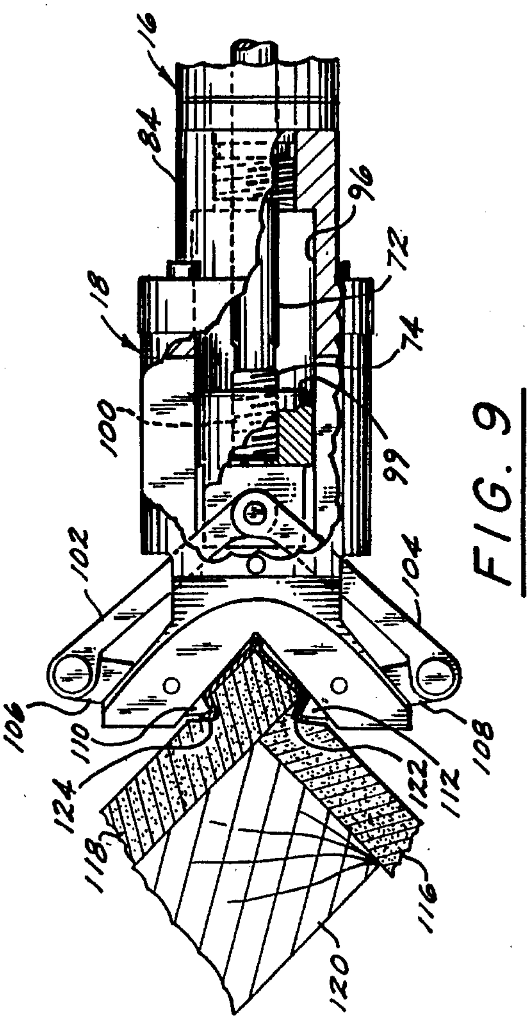
FIG. 9 is a top plan view, partly in cross section, depicting the device of FIG. 1 crimping the cornerbead of FIG. 8 to a wallboard corner.

Flanged housing portion 84 includes a central opening which is threaded and which is threadably engagable to the threading 68 on air cylinder 16. The interior of housing portion 88 includes a cylindrical bore 96 which is best shown in FIG. 9. Bore 96 communicates with the exterior of head 18 through a pair of opposed channels 98. Still referring to FIG. 9, a cylindrical lug 99 includes a smooth outer surface which is slidable in a forward and rearward direction within bore 96. Lug 98 includes a threaded opening 100 which threadably engages threading 74 on piston rod 70. Thus, as piston rod 70 reciprocates in and out of cylinder 16, lug 99 will move in a reciprocating manner within smooth bore 96. Lug 99 includes a forked termination which receives a pin for pivotable attachment to a pair of articulated arms 102 and 104. In turn, each of arms 102 and 104 are pivotably connected to a pair of crimping arms 106 and 108. Each of crimping arms 106 and 108 terminates at a sharpened tooth section 110 and 112.

The operation of the gripping device of the present invention will now be described. Of course, it will be appreciated that high pressure air is attached via fitting 27 to handle 12. When trigger 36 is actuated, valve 30 moves outwardly of valve seat 32 whereupon the high pressure air will pass into the lower portion of cavity 28 through channel 52 and passage 48. The high pressure air will then pass through fitting 13 where it will impinge or impact upon piston head 70. The high pressure air will then force piston head 70 towards the left of the figure whereupon piston shaft 72 will extend outwardly of cylinder 58. Simultaneously, lug 98 which is threadably attached to the end of piston shaft 72 will move longitudinally through housing 88 whereupon articulated arms 102 and 104 will swing outwardly causing arms 106 and 108 to pivot inwardly forcing teeth 110 and 112 into the position indicated by phantom lines in FIGS. 2 and 3 and shown by the solid lines in FIG. 9.

Figure 8:
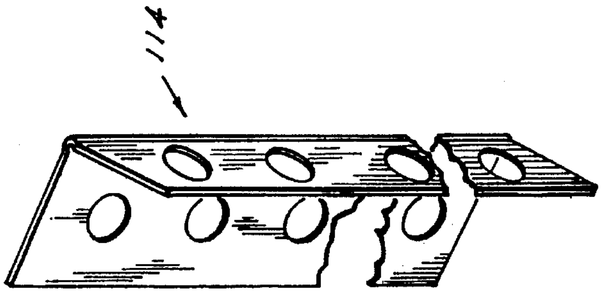
FIG. 8 is a perspective view of cornerbead used in conjunction with wallboard.

Turning now to FIG. 8, a section of well known cornerbead is shown generally at 114. Cornerbead 114 is a flat piece of metal having a bend longitudinally therethrough to define a corner section which is received over a wallboard corner such as depicted in FIG. 9. In FIG. 9, two sections of wallboard 116 and 118 are attached to a wall 120 to form a corner and a section of cornerbead 114 has been abutted against the wallboard corner. FIG. 9 also depicts the cornerbead crimping device of the present invention having been actuated by trigger 36 whereupon cornerbead 114 has been crimped at 122, 124 to wallboard 116 and 118.

An important feature of this invention is the presence of flow openings 54 in handle 12. It will be appreciated that subsequent to a crimping action as described above, spring 80 will urge piston head 70 to its normal positioning abutting flange 60. However, in order for this reciprocating action to take place, the fluid in cylinder 58 must have an exit; otherwise, spring 80 will not return piston head 70 to its original position. This required opening is provided by flow openings 54 and thereby allows the piston to regain its original position in preparation for a subsequent actuation by trigger 36.

Figure 11:
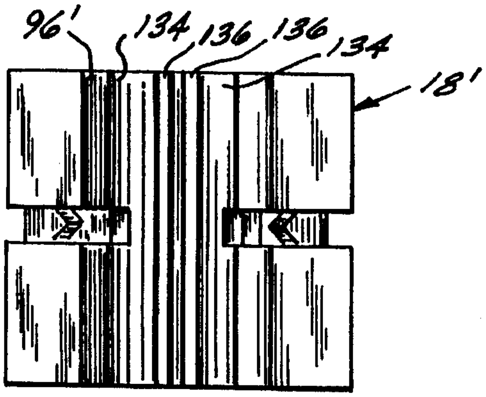
FIG. 11 is a front elevation view of a crimping device in accordance with a second embodiment of the present invention.
Figure 12:
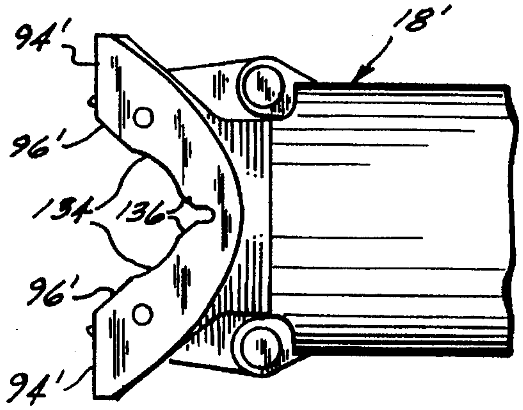
FIG. 12 is a side elevation view of the crimping device of FIG. 11.
Figure 10:
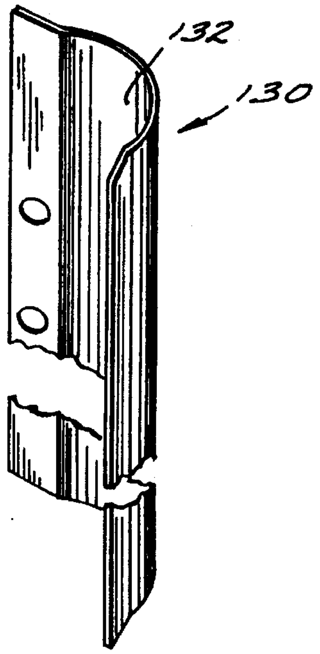
FIG. 10 is a perspective view of cornerbead having a rounded configuration.
Figure 13:
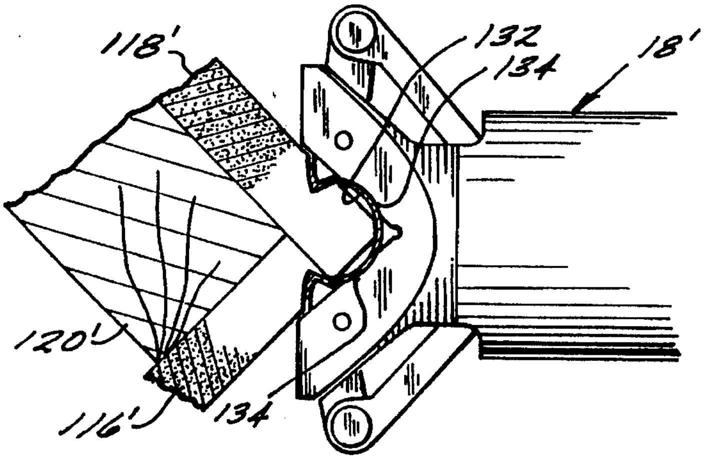
FIG. 13 is a side elevation view of the crimping device of FIG. 11 crimping the cornerbead of FIG. 10.
Figure 14:
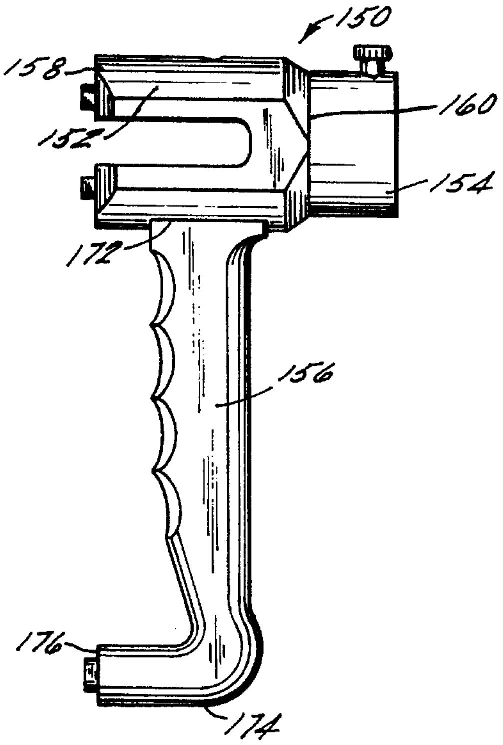
FIG. 14 is a side elevational view of a housing module in accordance with a second embodiment of the present invention.
Figure 15:
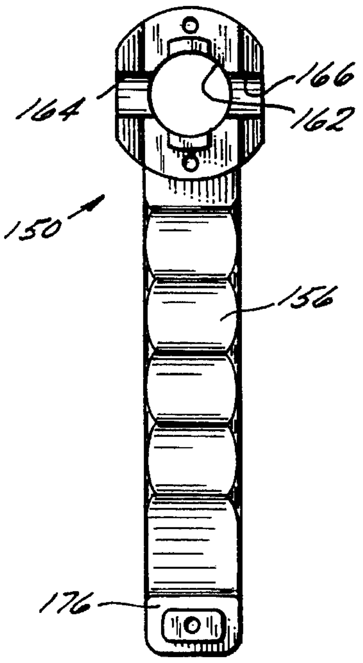
FIG. 15 is a front elevational view of the housing module of FIG. 14.
Figure 16:
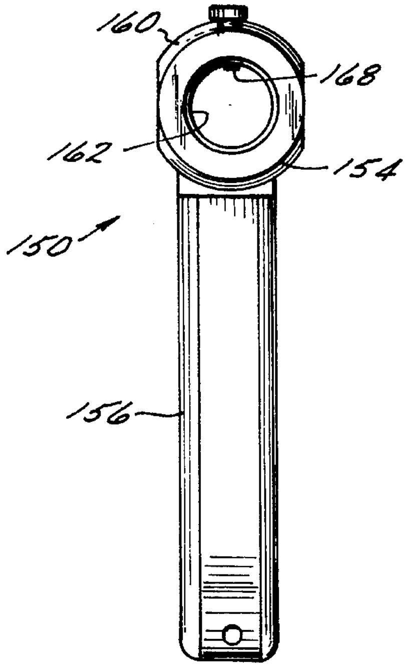
FIG. 16 is a rear elevational view of the housing module of FIG. 14.
Figure 17:
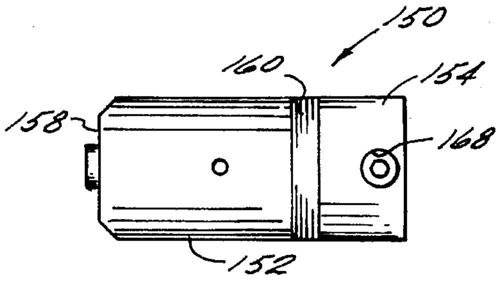
FIG. 17 is a top view of the housing module of FIG. 14.
Figure 18:
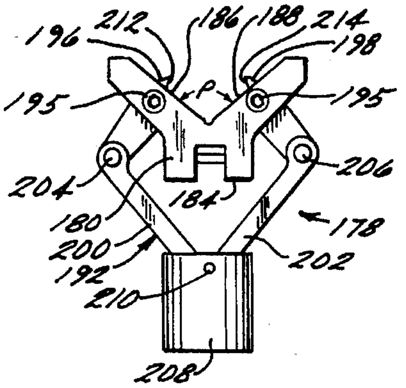
FIG. 18 is a top view of a crimper module of the present invention, including a first embodiment of a crimper module body.
Figure 20:
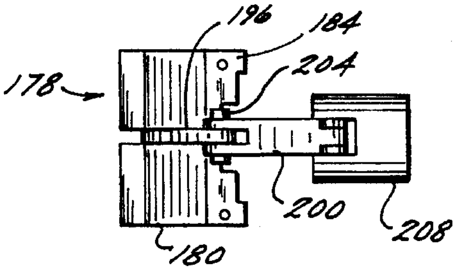
FIG. 20 is a side elevational view of the crimper module of FIG. 18.
Figure 21:
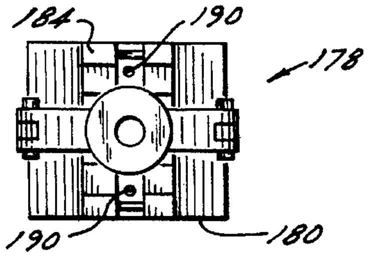
FIG. 21 is a rear elevational view of the crimper module of FIG. 18.

Turning now to FIG. 10, a section of cornerbead 130 having a rounded configuration 132 (as opposed to the 90 degree angled cornerbead 114 of FIG. 10) is shown. In FIGS. 11 and 12, an alternative embodiment of this invention for use with cornerbead 130 is shown at 18'. In this embodiment, V-section 96' includes a pair of opposed arcuate (or semi-cylindrical) cut-outs 134 formed along each arm of V-section 96'. As shown in FIG. 13, arcuate cut-outs 134 are sized and configured to receive and support rounded section 132 or cornerbead 130. In all other respects, the cornerbead crimping device of FIGS. 11 and 12 operates in the same manner as that described with regard to the first embodiment (see FIG. 9). An important feature of V-shaped head 96' is that it may be utilized with either cornerbead of the type shown in FIG. 10 or cornerbead of the type shown in FIG. 8. To permit this dual function, the arcuate cut-outs 134 are spaced downwardly from the root of the "V" so that two small intersecting planar portions 136 remain for receiving the angled base of cornerbead 114.

In a second and preferred embodiment, the crimper tool of the present invention is a user configurable system comprising a housing module, a plurality of interchangeable crimper modules and a plurality of interchangeable power modules.

Figure 32:
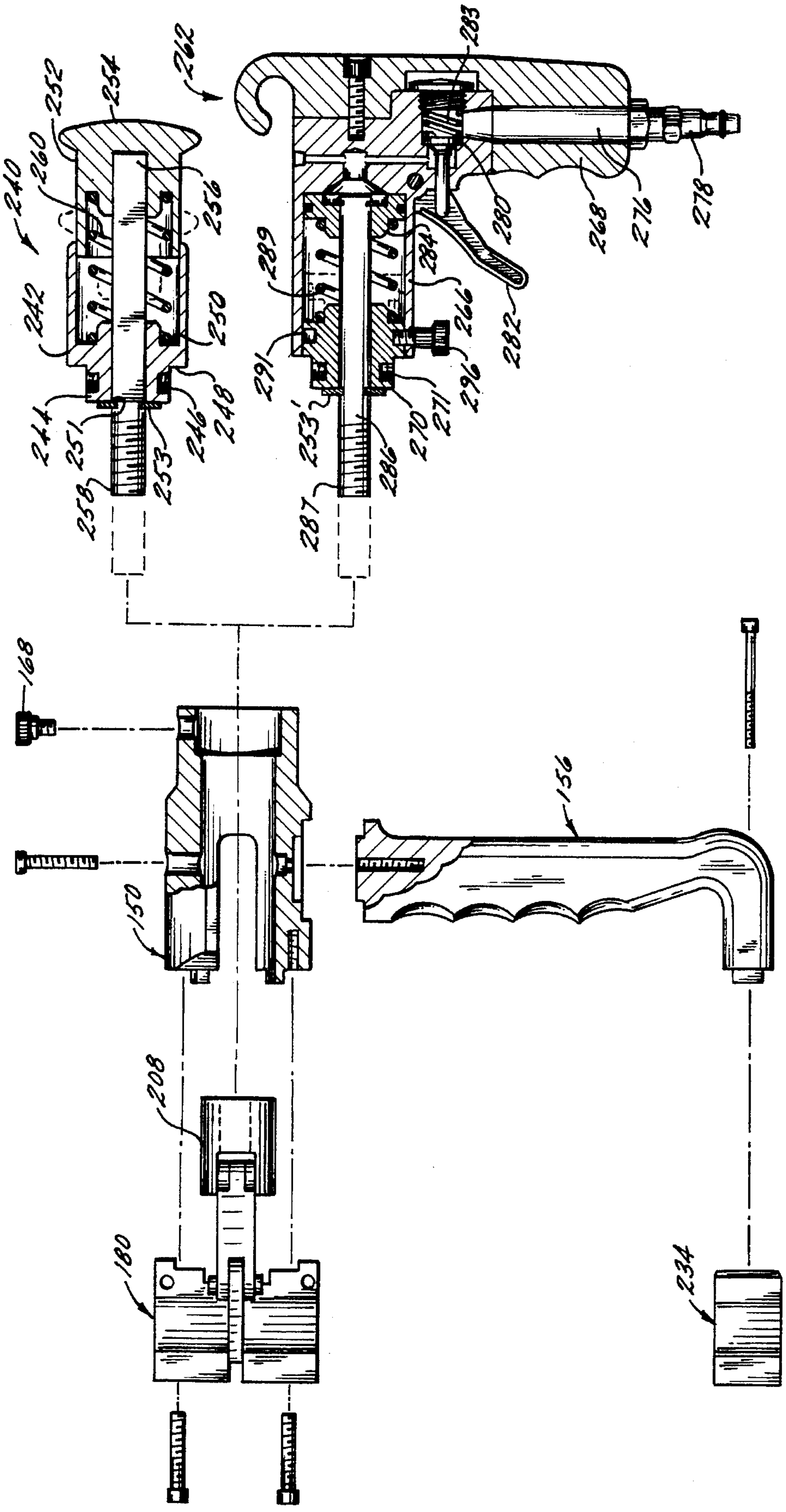
FIG. 32 is an exploded, longitudinal cross sectional view of a manual power module and a pneumatic power module of the present invention.

FIGS. 14–17 show respective side, front, back and top views of an embodiment of a housing module 150 of the user configurable system. FIG. 32 shows an exploded view of housing module 150. Housing module 150 includes a body 152, a collar 154 and a detachable handle 156. Body 152 extends longitudinally from a front end on which is defined an upper mounting surface 158 to allow mounting of the various interchangeable crimper modules (discussed below) on the housing module 150 to a back end 160 and defines a central bore 162 therethrough. The body 152 includes a pair of opposed slots 164, 166, each extending radially outwardly from central bore 162 to the front end 158 of body 152. Collar 154 extends rearwardly from the back end 160 of body 152. A pin 168 is provided through a hole in collar 154 and urged radially inwardly by a spring 170.

Handle 156 extends from a top end 172 secured to the body 152, to a bottom end 174. Handle 154 is contoured to provide a comfortable and secure handgrip. A lower mounting surface 176 is provided on the bottom end 174 of handle 154 to allow mounting of a lower guide module (discussed below) on the handle 154.

Two embodiments of crimper modules according to the present invention are shown in FIGS. 18–21.

FIGS. 18–21 show respective top, front and side views of a first embodiment of a crimper module 178. Crimper module 178 includes a crimper module body 180 having a contoured front end 182 for receiving a section of cornerbead and a contoured rear mounting surface 184 for locating the crimper module body 180 relative to the mounting surface 158 housing module 150. Front end 182 of body 180 includes two converging flat surfaces 186, 188 defining an angle ϕ therebetween, wherein ϕ between about 90° and 160°. Bolt holes 190 are provided for securing crimper module body 178 to housing module 150 by bolting crimper module body 178 to corresponding bolt holes defined in housing module body 152.

The crimper arm assembly 192 includes a pair of crimper blades 196, 198, a pair of opposed crimper arms 200, 202, and a lug 208 pivotably mounted on the crimper arms by pins 210, 212. Each crimper blade 196,198 includes a respective cutting edge 214, 216 defined on its front end. A threaded central bore extends forwardly from the back end of lug 208. The articulated crimper arm assembly 192 is pivotably mounted in opposed grooves 193, 194 defined in body 180 and pivotably joined to the respective blades 196, 198 by links 204, 206 and pivotably mounted on crimper module body 180 by pivots 195.

Figure 22:
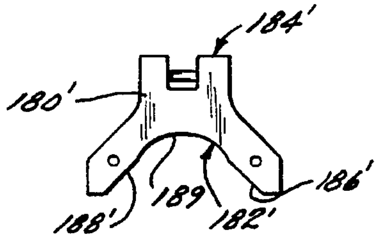
FIG. 22 is a top view of a second embodiment of a crimper module body.
Figure 19:
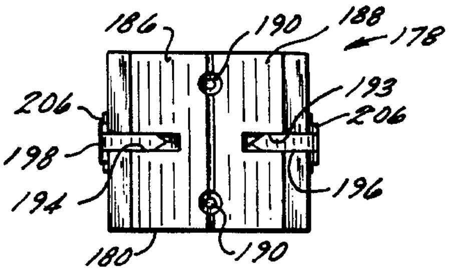
FIG. 19 is a front elevational view of the crimper module of FIG. 18.
Figure 23:
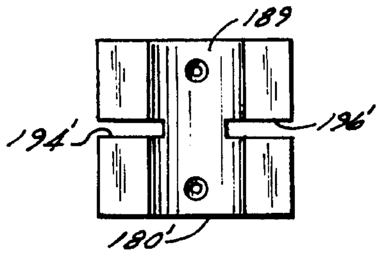
FIG. 23 is a front view of the crimper module body of FIG. 21.
Figure 28:
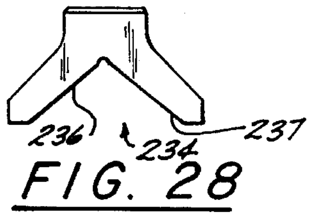
FIG. 28 is a bottom view of the crimper blade of FIG. 27.
Figure 30:
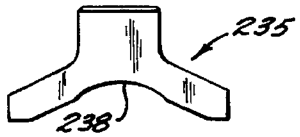
FIG. 30 is a top view of a second embodiment of the lower guide module of the present invention.
Figure 29:
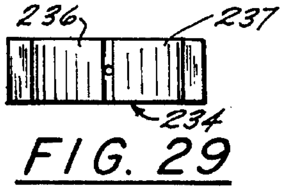
FIG. 29 is a front view of the lower guide module of FIG. 28.
Figure 31:
FIG. 31 is a front view of the lower guide module of FIG. 30.

An alternative embodiment of crimper module body 180' is shown in FIGS. 22 and 23 which is entirely analogous to body 180, except that it a curvilinear guide surface 189 is defined in its front end 182' between converging flat surfaces 186', 188', for receiving "bullnose" cornerbead sections having a curvilinear cross sectional contour while FIGS. 18–21 show two examples of crimper modules, it will be appreciated that the crimper modules may have any other desired configuration for attachment to a complimentary configured cornerbead.

FIGS. 24–27 show respective side, top, bottom and front views of a preferred embodiment of a crimper blade 218 of the present invention. Crimper blade 218 includes a lever portion 220 wherein holes 221, 222 are defined for pivotably mounting blade 218 to a respective crimper arm and crimper module body and a chisel point portion 223. Chisel point portion 223 is defined by flat surfaces 224–227. Upper cutting edges 228, 229 are formed along the respective convergences of surface 224 with surfaces 225 and 226. A central cutting edge 230 is formed by converging surfaces 225 and 226 and extends from the convergence of surfaces 224,225 and 226 to the apex of triangular surface 227. Lower cutting edges 231, 232 are defined along the respective convergences of surface 227 with surfaces 225, 226. Blades 218 provide a particularly desirable crimping action when used in the tool of the present invention. Edges 228–231 make five cuts into the cornerbead section and surfaces 224–227 and deform the cut cornerbead to imbed four tabs into the underlaying gypsum board to thereby anchor the cornerbead to the gypsum board much more securely than would be possible with a single edged crimper blade.

FIGS. 28, 29 and 30, 31 show two respective embodiments of the lower guide module of the present invention. Each of the modules 234, 235 have a respective contoured front end for receiving a correspondingly contoured cornerbead section. Lower guide module 234 has a guide surface comprising two converging flat surfaces, 236, 237 and would be used in combination with the crimper module 178 shown in FIGS. 18–21. Lower guide module 235 has a curvilinear guide surface 238 for use in combination within the crimper module 178' shown in FIGS. 22–23.

Attachment of a crimper module 178 and guide module 234 onto a housing module 150 is shown in FIG. 32.

FIG. 32 shows two respective embodiments of power modules of the present invention. A cross sectional view of a manual power module is shown at 240 while a cross sectional view of a pneumatic operated module is shown at 262. Manual power module 240 includes a tubular power module body 242. A collar 244 having a plurality of circumferentially spaced apart holes 246 extends forwardly from tubular power module body 242 and defines inner circumferential shoulder 248 at the front end of the power module body 242. An annular ring 250 is defined within body 242. A tubular plunger 252 having a closed input end 254 is slidably received within power module body 242. A plunger rod 256 is secured to the input end 254 and extends forwardly through tubular plunger and annular member 250 to a threaded end 258. The configuration of threaded end 258 is complementary to the threaded bore in lug 208.

The assembly formed by plunger 254 and rod 256 has a first position (shown in solid lines) wherein the plunger extends backwardly from the body 242 and threaded end 258 is retracted toward the body 242 and has a second position (shown in dotted lines) wherein the plunger 252 is received within the body 242 and the threaded end 258 of rod 256 extends forwardly from body 242. A spring 260 positioned between plunger 252 and annular ring 250 urges the plunger toward the first position.

Preferably, that portion of rod 256 within body 242 and plunger 254 has a rectangular (e.g., square) cross-section while that portion extending outwardly (e.g., threaded section 238 is circular in cross-section. The opening 251 through collar 244 has a complimentary rectangular cross-section thereby precluding rod 256 from rotation with respect to the module 240. Spring 260 is slightly biased urging threaded portion 258 of rod 256 inwardly (to the left). A snap ring 253 is removably friction fit over rod 256 (with a groove circumferentially about rod 256) and precludes the rod 256 from fully retracting.

As mentioned, FIG. 32 also shows a cross sectional view of a pneumatic power module 262 of the present invention. The pneumatic power module 262 includes a pneumatic power module body 264 having a cylinder portion 266 and a pistol grip portion 268. A collar 270 extends forwardly from the cylinder portion 266 and defines an annular seal mounted at the front end of cylinder portion 264. Fluid passages 274, 276 extend from cylinder portion 264 to the bottom end of the pistol grip portion 268. A quick-connect fitting 278 is mounted on the pistol grip portion 268 to enable connection of a compressed air line with fluid passage 276. Valve 280 is disposed between fluid passages 274, 276 for controlling fluid flow from passage 274 to passage 276. Valve 280 has a closed position (shown in solid lines) wherein it prevents fluid flow between passages 276 and 274 and an open position (shown in dotted lines) wherein fluid flow between passages 276 and 274 is permitted. A spring 283 urges valve 280 into the closed position. A pivotably mounted trigger 282 is provided for actuating valve 280.

A piston 284 is slidably received within cylinder portion 264. A piston rod 286 extends forwardly from piston 284 through collar 270 to a threaded front end 287. The configuration of threaded front end 287 is complimentary to threaded bore of lug 208. The assembly formed by piston 284 and rod 286 has a first position (shown in solid lines) wherein the rode 286 is retracted within cylinder 266 and a second position (shown in dotted lines) wherein rods 286 extends forwardly from cylinder 266. A spring 289 urges the piston 284 and rod 286 into the first position. The spring 289 may be overcome by actuating valve 280 to allow air pressure to act on piston 278.

Figure 40:
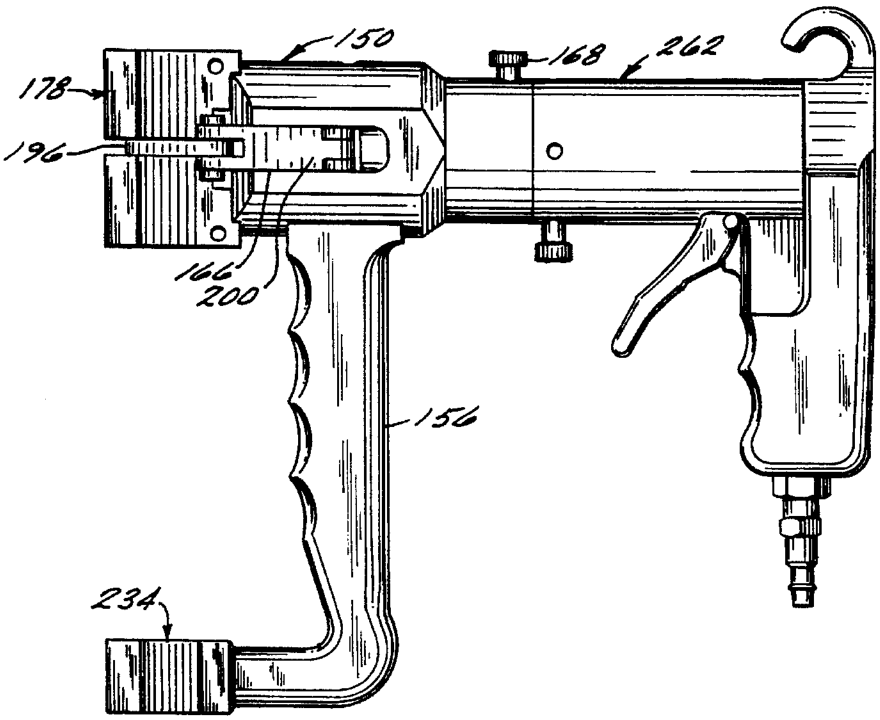
FIG. 40 shows a side elevational view of a second configuration of the crimper tool of the present invention.
Figure 41:
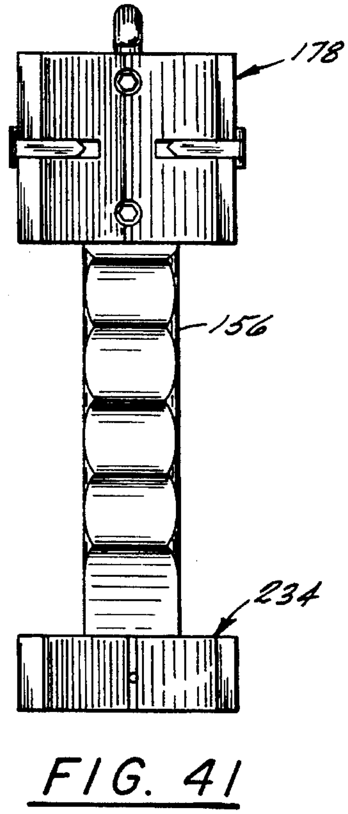
FIG. 41 shows a front elevational view of the tool of FIG. 40.
Figure 42:
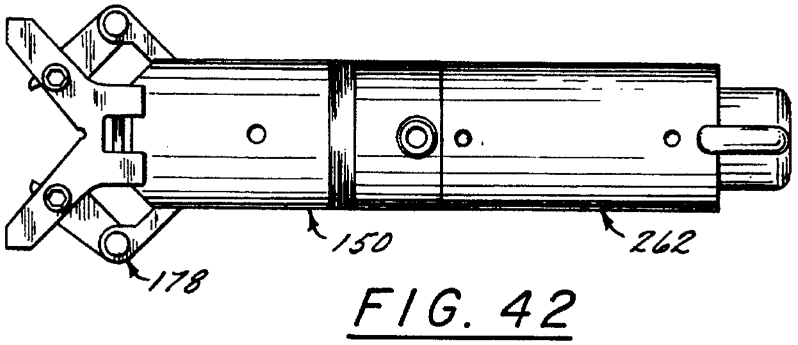
FIG. 42 shows a top view of the tool of FIG. 40.
Figure 43:
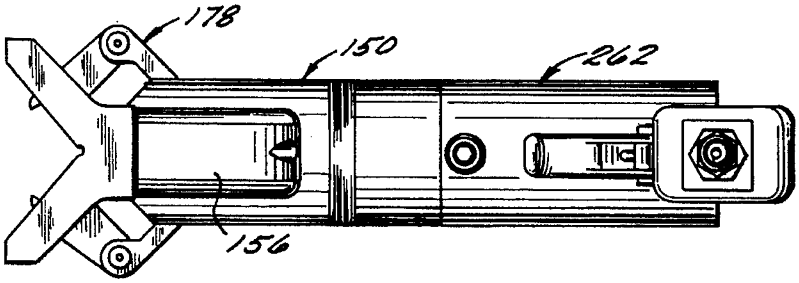
FIG. 43 shows a bottom view of the tool of FIG. 40.
Figure 44:
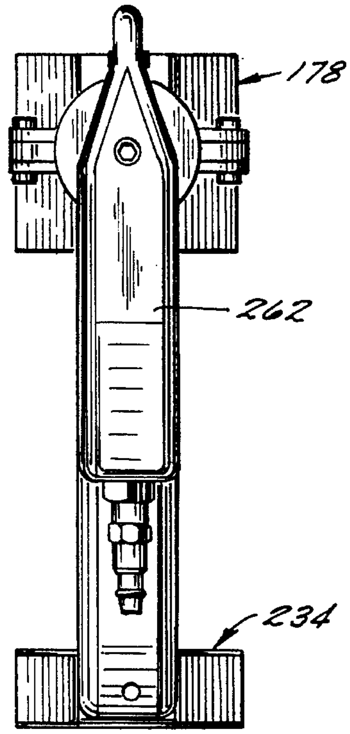
FIG. 44 shows a rear elevational view of the tool of FIG. 40.

Collar 270 is rotatably mounted at the front end of cylinder 266. Collar 270 includes a circumferential groove 291. Three threaded members are threaded through spaced openings in cylinder 266 and are seated in groove 291 so that cylinder 266 rotates relative to collar 270. A set screw 296 also is threaded through cylinder 266 into groove 291. Set screw 296 is then tightened at a selected orientation of power module 262 (relative to housing 150 as shown in FIG. 40) to prevent further rotation of cylinder 266. The result is a means for easily rotating or swiveling power module 262 during use.

By selectively combining the various modular elements of the present invention, a user is able to configure the crimping tool of the present invention to fit any of a variety of applications.

FIGS. 34–39 show respective side, front, top, bottom, back and partially broken away side views of one configuration of the crimper tool of the present invention, i.e. an embodiment comprising the combination of housing module 150, crimper module 178, lower guide module 234 and manual power module 240.

Crimper module 178 is bolted to the front end of housing body 152 with lug 208 being slidable received within bore 162 of the housing body 152 and with articulated arms 200, 202 being slidably received within opposed slots 164, 166 of the housing body 152.

Threaded end 258 of plunger rod 256 of manual power module 240 is threadably received by the threaded bore of lug 208 to operatively associate the power module with the crimper arm.

Collar 244 of power module 240 is slidably received within collar portion 154 of housing module 150 and secured by extension of pin 168 into one of the plurality of holes 245 in collar 244 to secure the manual power unit to the housing body. The collar and pin arrangement for securing the manual power module 240 to the housing module 150 allows adjustment of the position of the crimper blades 196, 198 in order to control the depth of cut made by the crimper blades. By disengaging pin 168 from collar 244 rotating the crimper module body 242 relative to the housing module 150, the amount of threaded end 258 received within lug 208 and thus the range of travel of the lug 208 and blades 196, 198 may be adjusted.

Lower guide module 234 is bolted to the mounting surface 176 of the lower end of handle 156.

FIGS. 40–44 show respective side, front, top, bottom and back views, of a second configuration of the crimper tool of the present invention, i.e. the combination of housing module 150, crimper module 178, pneumatic power module 262 and lower guide module 234.

In a manner analogous to that shown in FIGS. 34–38 above, crimper unit 178 is bolted to the front end of housing body 152 with lug 208 being slidably received within bore of the housing body 152 and with articulated arms 200, 202 being slidably received with respective slots 164, 166 of the housing body 152. Threaded end 282 of piston rod 280 of pneumatic power unit 262 is threadably received by threaded bore of lug 208 to operatively associate the power module 262 with the crimper arm assembly 192.

Collar 290 of pneumatic power module 262 is slidably received within collar 154 of housing body 150 and secured by extension of pin 168 into a mounting hole 294 defined in collar 290.

Lower guide module 234 is bolted to the mounting surface 176 defined on the front of the lower end of handle 156.

Figure 33A:
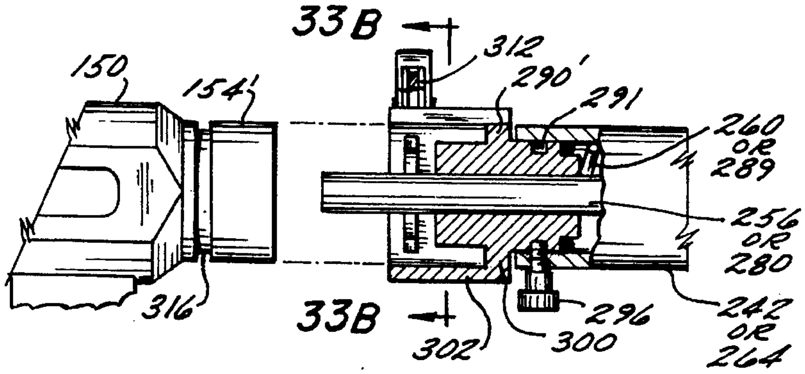
FIG. 33A is a longitudinal cross section view, partly cut away, of an alternative locking mechanism in accordance with the present invention.
Figure 33B:
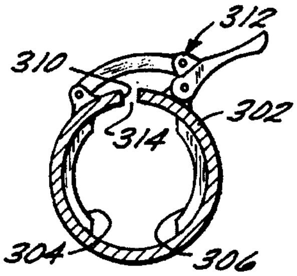
FIG. 33B is a left end view of a portion of the locking mechanism of FIG. 33A.
Figure 39:
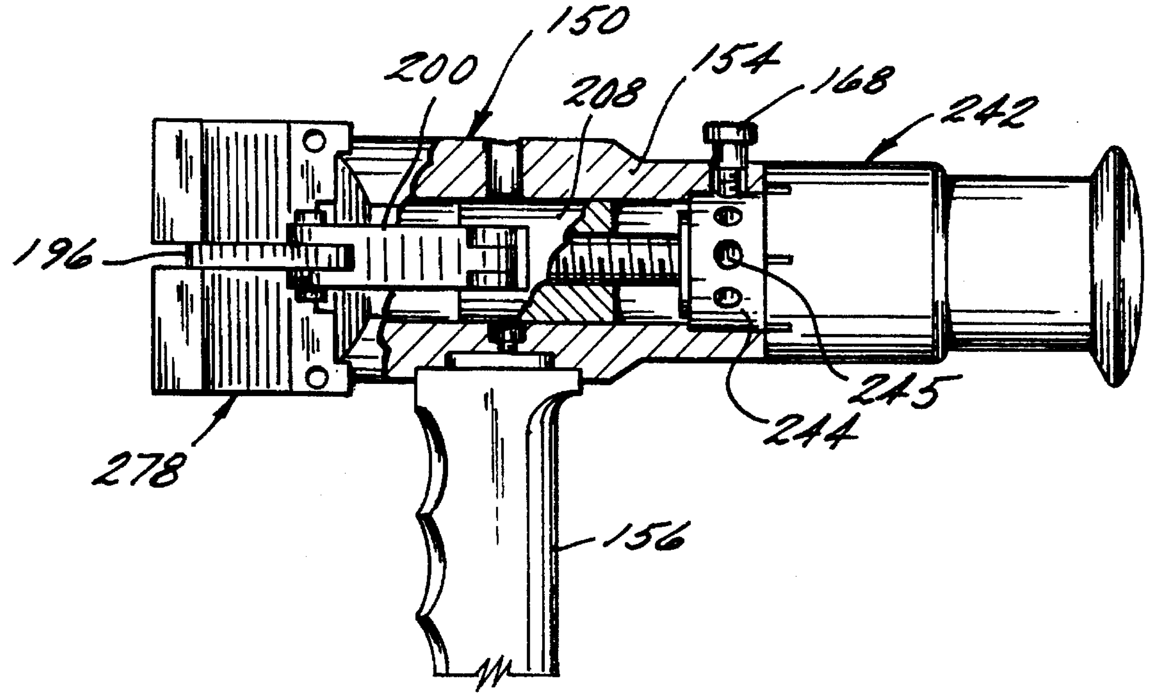
FIG. 39 is a partially broken away view of a portion of the tool of FIG. 34.

In a preferred embodiment, rather than utilizing the plurality of holes 246 in collar 244 (or holes 271 in collar 270) together with locking pin 168 (as shown in FIG. 39) to lock in the adjusted spacing of cutters 220, FIGS. 33A and 33B depict an alternative locking configuration. In FIGS. 33A and 33B, collar 290' includes an annular radial extension 300 which terminates at a cylindrical sleeve 302. Sleeve 302 has an inner diameter which is sized to slip over the outer diameter of collar portion 154' of housing portion 150. Sleeve 302 also includes a pair of spaced, circumferentially aligned bosses 304, 306 spaced inwardly from the outer end 308 thereof. A longitudinal split 310 is defined through at least a portion of the length of sleeve 302 so that sleeve 302 is configured as a split clam shell. A known clamp 312 is fixed to either side of split 310. It will be appreciated that when clamp 312 is actuated, the gap 314 in split 310 is made smaller.

In conjunction with the FIGS. 33A and 33B embodiment, a continuous circumferential groove 316 is provided on the outside of collar portion 154'. During use, sleeve 302 is placed over collar portion 154' until bosses 304, 306 are loosely engaged in groove 316. Next, plunger rod 256 or 280 is connected to the lug 208 of the crimper module as described above and appropriate threading takes place so as to place the cutters 220 at a desired spacing. When the desired spacing is reached, the clamp 312 is actuated so that the clam shell sleeve 302 is tightly held to collar portion 154' with bosses 304, 306 being retained in groove 316. Thus, sleeve 302 acts to both lock the power module (either manual or pneumatic) to the housing module and to lock the cutters into a desired respective orientation.

Figure 45:
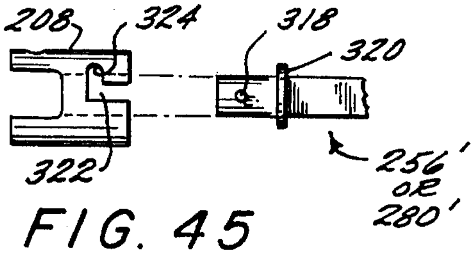
FIG. 45 is a side-elevation view of an alternative embodiment of a means for locking the plunger rod to the crimping module.
Figure 25:
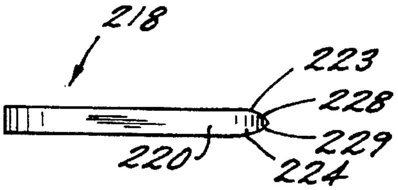
FIG. 25 is a top view of a crimper blade of FIG. 24.
Figure 24:
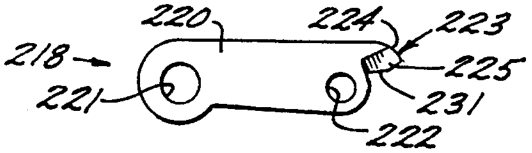
FIG. 24 is a side elevational view of a crimper blade of the present invention.
Figure 27:
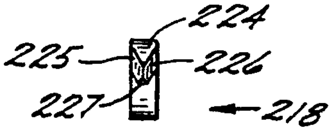
FIG. 27 is a front view of the crimper blade of FIG. 27.
Figure 26:
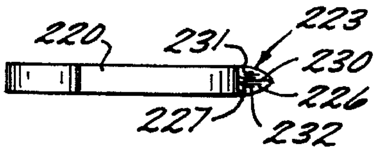
FIG. 26 is a bottom view of a crimper blade of FIG. 24.
Figure 34:
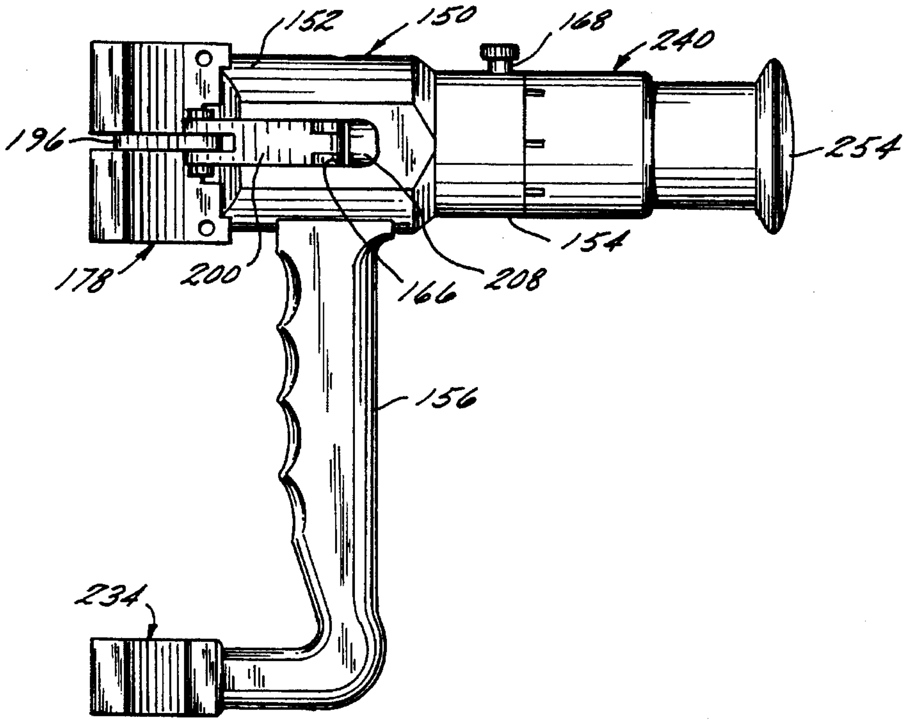
FIG. 34 is a side elevational view of a first configuration of the crimper tool of the present invention.
Figure 35:
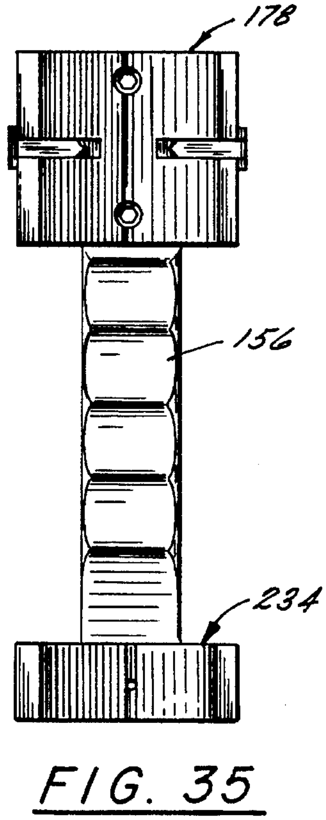
FIG. 35 is a front elevational view of the crimping tool shown in FIG. 34.
Figure 36:
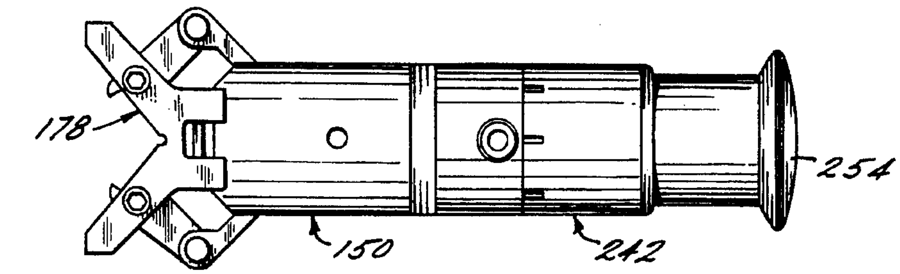
FIG. 36 is a top view of the tool of FIG. 34.
Figure 37:
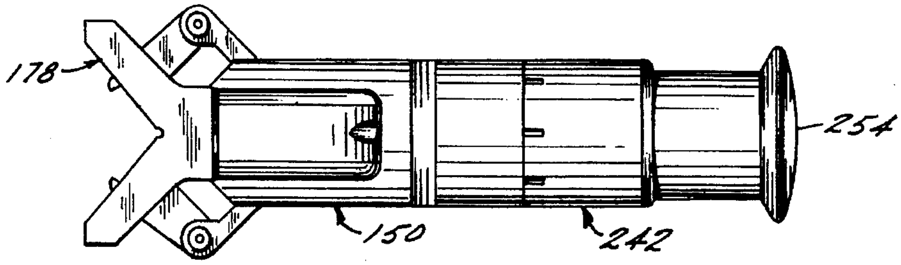
FIG. 37 is a bottom view of the tool of FIG. 34.
Figure 38:
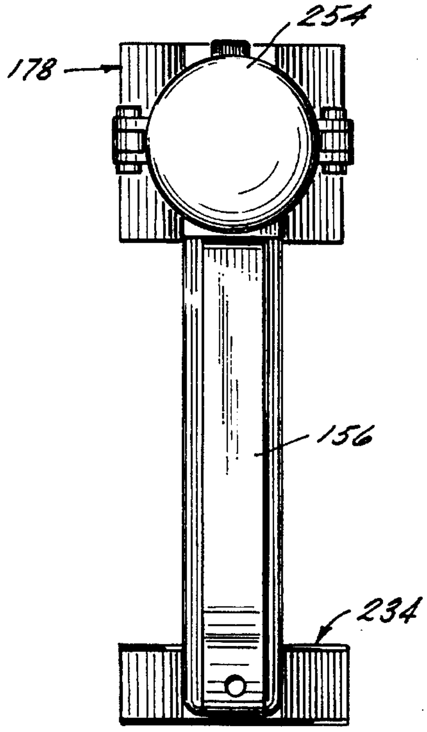
FIG. 38 is a rear elevational view of the tool of FIG. 34.

Rather than using the threaded plunger rod 256 or 280, in FIG. 45, an alternative plunger rod 256' or 280' includes a lock and key arrangement including a transversely extending pin 318 and spaced annular ridge 320. Pin 318 is received in a slot 322 in lug 208'. When pin 318 is fully seated in slot 322, ridge 320 will abut lug 208'. At that point, rod 256' is rotated 90 degrees so that pin 318 is locked into a second slot 324 which is transverse to slot 322.

In accordance with an important feature of the modular embodiment of this invention, the crimper modules, housing module and power modules are all molded from a suitable reinforced plastic. As a result, the tool is lightweight and allows for low cost manufacture and use. Still another important feature of this invention is the ability to be used either in a manual or pneumatic mode depending upon the user's preference (and availability of a compressed air source).

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A modular tool kit for crimping profiled cornerbead, wherein said cornerbead is available in a plurality of different profiles, comprising:

(1) a housing module comprising a housing module body extending longitudinally from a front end to a back end and defining a longitudinal bore therethrough;

(2) a plurality of interchangeable crimper modules, each of said crimper modules comprising;

(a) guide means, having a profiled guide surface complimentary to a respective profiled cornerbead, for receiving the respective profiled cornerbead;

(b) attachment means for releasably securing guide means to said front end of said housing module;

(c) articulated crimper arm means, for crimping a respective profiled cornerbead received in the guide means wherein said crimper arm means comprises a pair of opposed crimper blades, pivotably mounted on said guide means and said crimper arm means, having an open position wherein said opposed blades are pivotably displaced apart from each other and having a crimping position wherein said crimper blades are pivotably displaced toward each other; and (d) lug means, pivotably connected to said articulated crimper arm means and slidably receivable within the longitudinal bore of the housing module, for mounting said arms between said open and crimping positions;

(3) a plurality of interchangeable power modules, each of said power modules comprising;

(a) a power module body;

(b) means for releasably securing said power module body to said back end of said housing module;

(c) actuator means, longitudinally displaceable relative to said power module body and releasably securable to said articulated crimper arm means; and (d) transducer means for receiving energy input and for translating said energy input into longitudinal movement of said actuator means;

wherein said power module comprises a manual power module, wherein the actuator means of said manual power module comprises a rod, wherein the transducer means of said manual power module comprises a plunger slidably mounted within the manual power module and wherein energy is input to said manual power module by applying impact energy to said plunger.

2. The tool of claim 1, wherein the plunger has a first end slidably received by the power module body and a second end for applying impact to the plunger and where the plunger has a first position wherein the second end of the plunger is longitudinally rearwardly displaced from the power module body and a second position wherein the second end of the plunger is longitudinally forwardly displaced toward the power module body and wherein the manual power module further comprises resilient means for urging said plunger toward said second position.

3. The tool of claim 2 wherein the application of impact energy to said second end of the plunger longitudinally displaces said plunger, said rod and said lug means whereby said lug means pivotably displaces said crimper blades into said crimping position.

4. A modular tool kit for crimping profiled cornerbead, wherein said cornerbead is available in a plurality of different profiles, comprising:

(1) a housing module comprising a housing module body extending longitudinally from a front end to a back end and defining a longitudinal bore therethrough;

(2) a plurality of interchangeable crimper modules, each of said crimper modules comprising:

(a) guide means, having a profiled guide surface complimentary to a respective profiled cornerbead, for receiving the respective profiled cornerbead;

(b) attachment means for releasably securing guide means to said front end of said housing module;

(c) articulated crimper arm means, for crimping a respective profiled cornerbead received in the guide means; and (3) a plurality of interchangeable power modules, each of said power modules comprising:

(a) a power module body;

(b) means for releasably securing said power module body to said back end of said housing module;

(c) actuator means, longitudinally displaceable relative to said power module body and releasably securable to said articulated crimper arm means; and (d) transducer means for receiving energy input and for translating said energy input into longitudinal movement of said actuator means;

wherein said means for releasably securing said power module body to said back end of said housing module comprises:

sleeve means extending outwardly from said power module body and being received over said back end of said housing module, a longitudinal split through at least a portion of said sleeve means, said clamp means bridging said split;

boss means on an interior surface of said sleeve means, said boss means being received in groove means on said back end of said housing module; and clamp means for clamping said sleeve means about said back end of said housing means.

5. A modular tool kit for crimping profiled cornerbead, wherein said cornerbead is available in a plurality of different profiles, comprising:

(1) a housing module comprising a housing module body extending longitudinally from a front end to a back end and defining a longitudinal bore therethrough;

(2) a plurality of interchangeable crimper modules, each of said crimper modules comprising:

(a) guide means, having a profiled guide surface complimentary to a respective profiled cornerbead, for receiving the respective profiled cornerbead;

(b) attachment means for releasably securing guide means to said front end of said housing module;

(c) articulated crimper arm means, for crimping a respective profiled cornerbead received in the guide means; and (3) a plurality of interchangeable power modules, each of said power modules comprising:

(a) a power module body;

(b) means for releasably securing said power module body to said back end of said housing module;

(c) actuator means, longitudinally displaceable relative to said power module body and releasably securable to said articulated crimper arm means wherein said actuator means comprises a rod and wherein said rod is releasably securable to said articulated crimper arm means using key means, said key means comprising a male portion extending from said rod and a female portion associated with said articulated crimper arms means for receiving and locking said male portion; and (d) transducer means for receiving energy input and for translating said energy input into longitudinal movement of said actuator means.

6. A modular tool kit for crimping profiled cornerbead, wherein said cornerbead is available in a plurality of different profiles, comprising:

(1) a housing module comprising a housing module body extending longitudinally from a front end to a back end and defining a longitudinal bore therethrough;

(2) a plurality of interchangeable crimper modules, each of said crimper modules comprising:

(a) guide means, having a profiled guide surface complimentary to a respective profiled cornerbead, for receiving the respective profiled cornerbead;

(b) attachment means for releasably securing guide means to said front end of said housing module;

(c) articulated crimper arm means, for crimping a respective profiled cornerbead received in the guide means wherein said articulated crimper arm means includes a pair of cooperating crimper arms, each of said crimper arms comprising a chisel point portion, said chisel point portion including cutting edge means having at least five cutting edges defined by at least four surfaces; and (3) a plurality of interchangeable power modules, each of said power modules comprising:

(a) a power module body;

(b) means for releasably securing said power module body to said back end of said housing module;

(c) actuator means, longitudinally displaceable relative to said power module body and releasably securable to said articulated crimper arm means; and (d) transducer means for receiving energy input and for translating said energy input into longitudinal movement of said actuator means.

7. A modular tool kit for crimping profiled cornerbead, wherein said cornerbead is available in a plurality of different profiles, comprising:

(1) a housing module comprising a housing module body extending longitudinally from a front end to a back end and defining a longitudinal bore therethrough;

(2) a plurality of interchangeable crimper modules, each of said crimper modules comprising:

(a) guide means, having a profiled guide surface complimentary to a respective profiled cornerbead, for receiving the respective profiled cornerbead;

(b) attachment means for releasably securing guide means to said front end of said housing module;

(c) articulated crimper arm means for crimping a respective profiled cornerbead received in the guide means; and (3) a plurality of interchangeable power modules, each of said power modules comprising:

(a) a power module body;

(b) means for releasably securing said power module body to said back end of said housing module;

(c) actuator means, longitudinally displaceable relative to said power module body and releasably securable to said articulated crimper arm means wherein said actuator means comprises a rod having opposed first and second ends, with said first end being cylindrical and being releasably securable to said articulated crimper arm means and said second end being rectangular and being positioned within said power module body; and (d) transducer means for receiving energy input and for translating said energy input into longitudinal movement of said actuator means.

8. A tool for crimping profiled cornerbead, wherein said cornerbead is available in a plurality of different profiles, comprising:

(1) a housing comprising a housing body extending longitudinally from a front end to a back end and defining a longitudinal bore therethrough and a handle extending substantially perpendicularly from the housing body to a bottom end;

(2) a crimper module comprising:

(a) guide means, having a profiled guide surface complimentary to a respective profiled cornerbead, for receiving the respective profiled cornerbead;

(b) attachment means for releasably securing guide means to said first end of said housing module;

(c) articulated crimper arm means, for crimping a respective profiled cornerbead received in the guide means;

(3) a lower guide module having a profiled guide surface complimentary to the respective profiled cornerbead mounted on a bottom end of the handle, with said profiled surface of said lower guide body being aligned with but spaced from said profiled surface of said crimper module, for receiving the respective profiled cornerbead; and (4) a power module comprising:

(a) a power module body;

(b) means for releasably securing said power module body to said back end of said housing module;

(c) actuator means, longitudinally displaceable relative to said power module body and releasably securable to said articulated crimper arm means; and (d) transducer means for receiving energy input and for translating said energy input into longitudinal movement of said actuator means.

9. The tool of claim 8, wherein:

said crimper arm means comprises a pair of opposed crimper blades, pivotably mounted on said guide means and said crimper arm means, having an open position wherein said opposed blades are pivotably displaced apart from each other and having a crimping position wherein said crimper blades are pivotably displaced toward each other; and lug means, pivotably connected to said articulated crimper arm means and slidably receivable within the longitudinal bore of the housing module, for mounting said arms between said open and crimping positions.

10. The tool of claim 9, wherein said power module comprises a manual power module, wherein the actuator means of said manual power module comprises a rod, wherein the transducer means of said manual power module comprises a plunger slidably mounted within the manual power module body and wherein energy is input to said manual power module by applying impact energy to said plunger.

11. The tool of claim 10, wherein the plunger has a first end slidably received by the power module body and a second end for applying impact to the plunger and where the plunger has a first position wherein the second end of the plunger is longitudinally rearwardly displaced from the power module body and a second position wherein the first end of the plunger is longitudinally forwardly displaced toward the power module body and wherein the manual power module further comprises resilient means for urging said plunger toward said second position.

12. The tool of claim 11 wherein the application of impact energy to said second end of the plunger longitudinally displaces said plunger, said rod and said lug means whereby said lug means pivotably displaces said crimper blades into said crimping position.

13. The tool of claim 9, wherein said power module comprises a pneumatic power module, wherein the transducer means of the pneumatic power module comprises a pneumatic piston and cylinder assembly, a passage for connecting said cylinder to a source of pressurized fluid, valve means for controlling fluid flow through said passage and trigger means for actuating said valve means, wherein said actuator means comprises a piston rod mounted on said piston and where energy is input to said pneumatic power module by allowing flow of pressurized fluid to said piston and cylinder assembly.

14. The tool of claim 8, wherein the guide means comprises an angular guide means having a rectilinearly profiled guide surface defining an included angle from about 90° to about 160°.

15. The tool of claim 8 wherein said means for releasably securing said power module body to said back end of said housing module comprises:

sleeve means extending outwardly from said power module body and being received over said back end of said housing module;

boss means on an interior surface of said sleeve means, said boss means being received in groove means on said back end of said housing module; and clamp means for clamping said sleeve means about said back end of said housing means.

16. The tool of claim 15 including:

a longitudinal split through at least a portion of said sleeve means, said clamp means bridging said split.

17. The tool of claim 8 wherein said actuator means comprises:

a rod and wherein said rod is releasably securable to said articulated crimper arm means using key means, said key means comprising a male portion extending from said rod and a female portion associated with said articulated crimper arms means for receiving and locking said male portion.

18. The tool of claim 8 wherein said articulated crimper arm means includes a pair of cooperating crimper arms, each of said crimper arms comprising:

a chisel point portion, said chisel point portion including cutting edge means having at least five cutting edges defined by at least four surfaces.

19. In a tool for crimping cornerbead which employs articulated crimper arm means including a pair of cooperating crimper arms, the improvement comprising:

each of said crimper arms means including a chisel point portion, said chisel point portion including cutting edge means having at least five cutting edges defined by at least four surfaces.

* * * * *